Figure 1:
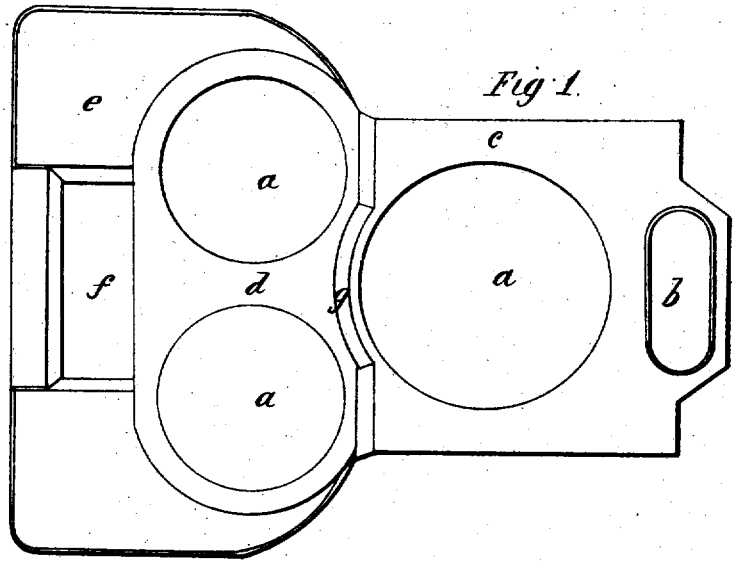
Figure 2:
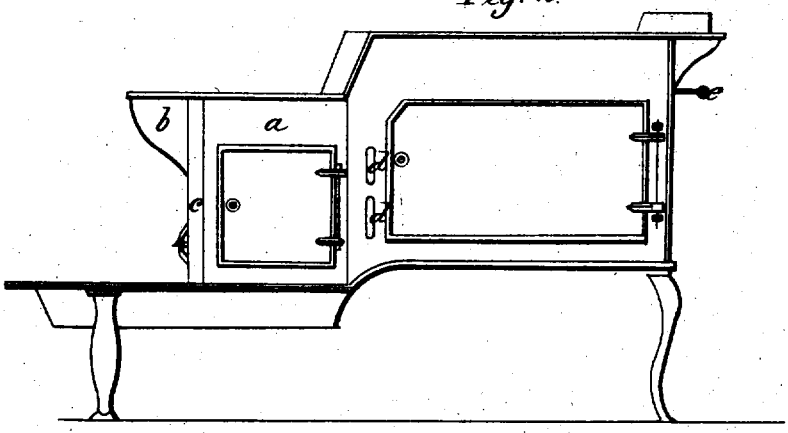
Figure 3:
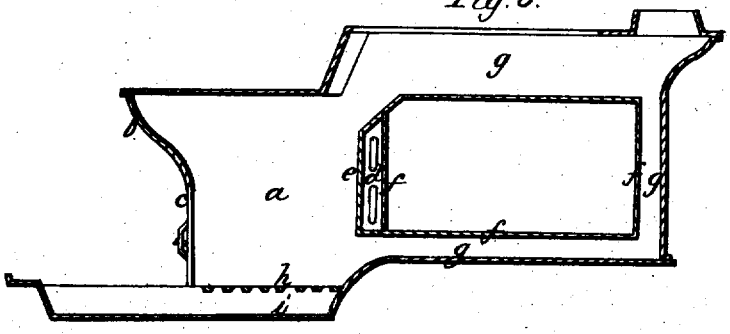

8677X

J. Rathbone,

Cook Stove.

Patented Mar. 6, 1835.

Mar 6 1835 8677X 305

Joel Rathbone Albany N.Y.

Letters Patent

The Schedule referred to in these Letters Patent and making part
of the same containing in the words of the said Joel Rathbone himself
of his improvement in the fenz harp or flat Cook Stove.

Specification of improvements made in the fenz harp or flat Cook
Stove by Joel Rathbone Albany N.Y.
Whereas inconvenience has arisen in the use of said Stove on account
of the waste of heat the burning out of the guard or front oven plate
and the unequal distribution of heat through the oven. Therefore
certain improvements have been introduced which consist.
1st In recessing by a curve line or sweep so much of the front fur-
nace plate as lies below the kettles in such manner as to
bring the face thereof more or less under the fire or bottom of the
kettles — and 2nd In opening on the back side between
the furnace and the oven, and between the flue that passes
over and the flue that passes under the oven a horizontal pas-
sage for the air to circulate through. For further information
reference may be had to the drawings and explanations connected
herewith — What I claim as my invention & improvement
is first, the introduction into the fenz Harp or flat Cook Stove
of the aforesaid horizontal flue between the furnace and the
oven, and second the combining therewith in said Stove, the
recessed or sunk front plate in manner aforesaid together with
the uses to which the same has been or may hereafter be applied Witnesses
Chs Cooper
A. Sparhawk Joel Rathbone Ex.d
C.J.W.

275 [illegible]

(Drawing.)